United States Patent [19]

Pfeiffer et al.

[11] Patent Number: 5,736,603

[45] Date of Patent: Apr. 7, 1998

[54] ELECTRICALLY CONDUCTIVE THERMOPLASTIC COMPOSITE MATERIALS AND A PROCESS FOR THEIR PREPARATION

[75] Inventors: Bernhard Pfeiffer, Kelkheim; Joachim Heydweiller, Rüsselsheim; Josefa Risch, Liederbach, all of Germany

[73] Assignee: Hoechst AG, Frankfurt, Germany

[21] Appl. No.: 514,946

[22] Filed: Aug. 14, 1995

[30] Foreign Application Priority Data

Aug. 16, 1994 [DE] Germany .................. 44 29 028.4

[51] Int. Cl.[6] .................. C08J 5/10; C08K 3/04; C08L 75/04
[52] U.S. Cl. .................. 524/495; 252/511; 252/512; 252/513; 524/492; 524/493; 524/494
[58] Field of Search .................. 252/511, 512, 252/513; 524/492, 493, 494, 495, 496

[56] References Cited

U.S. PATENT DOCUMENTS

Re. 32,772   10/1988   Hawley .................. 264/108
3,996,167   12/1976   Brown .................. 252/513

FOREIGN PATENT DOCUMENTS 0579047   1/1994   European Pat. Off. .

OTHER PUBLICATIONS

*ASTM: Designation D883—Standard Terminology Relating to Plastics* (Feb. 1996), pp. 1–2.

Database WPI, Derwent Publications Ltd., London, GB, AN 87–069159 & JP-A-62 022 836, Jan. 31, 1987.

Database WPI, Derwent Publications Ltd., London, GB, AN 83–824031 & JP-A-58 176 220, Oct. 15, 1983.

Database WPI, Derwent Publications Ltd., London, GB, AN 83–756418 & JP-A-58 129 031, Aug. 1, 1983.

*Primary Examiner*—Vasu Jagannathan
*Assistant Examiner*—U. K. Rajguru
*Attorney, Agent, or Firm*—Frommer, Lawrence, Haug LLP

[57] ABSTRACT

The invention relates to electrically conductive thermoplastic composite materials which have specific volume resistances of less than $10^9$ ohm cm and comprise 0.1 to 70% by volume of electrically conductive fibers impregnated with a thermoplastic elastomer, to a process for their preparation and to their use.

26 Claims, No Drawings

ND OF THE INVENTION

The invention relates to electrically conductive thermoplastic composite materials which comprise electrically conductive fibers, to a process for their preparation and to their use.

BACKGROUND OF THE INVENTION

For a large number of applications it is necessary to employ elastic, flexible conductive plastics. For this purpose, various rubbers (silicone rubber and the like) or similar systems have been modified with carbon black. These rubbers are thermosetting systems which cannot be processed thermoplastically. Furthermore, the elastic plastics obtained have the disadvantage that they are black and have only a low conductivity at reasonable degrees of filling. In addition, it is also known to impregnate conductive fibers, above all steel fibers, with thermoplastics in a melt pultrusion process (U.S. Reissue Pat. No. 32772; EP-A 0 579 047). During subsequent processing of the semi-finished products to functional components (for example by means of injection molding, extrusion or blow molding), the fibers form a conductive network which imparts to the plastic a high electrical conductivity and therefore shielding from electromagnetic waves. However, the main purpose of these fiber-reinforced thermoplastics is generation of electrical conductivity while maintaining the mechanical properties, such as high strength and rigidity.

DETAILED DESCRIPTION OF THE INVENTION

The invention is based on the object of developing electrically conductive, elastic thermoplastics and a process for their preparation.

Electrically conductive thermoplastic composite materials have now been found, which have specific volume resistances of less than $10^9$ ohm cm and comprise 0.1 to 70% by volume of electrically conductive fibers impregnated with a thermoplastic elastomer.

Thermoplastic elastomers which can be employed are all polymers which show rubber-elastic properties, soften under the influence of heat and solidify reversibly again by cooling to give a flexible body, in particular polystyrene elastomers (TPS), elastomers based on polyurethane (TPU), polyester (TPE-E), polyamide (TPA), olefinic thermoplastic-elastomer blends (TPO), PP-EPDM blends (with an elastomer content of more than 70% by weight) and impact modified thermoplastics having an elastomer content of less than 70% by weight. Furthermore, it is also possible to replace 5-95% by volume of the thermoplastic elastomer by non-elastomeric thermoplastics. The electrically conductive fibers can be high-quality high-grade steel fibers, or else other metal fibers, for example of iron, steel, copper, aluminum or nickel. It is also possible to use metallized glass or carbon fibers. Because of their conductivity, carbon fibers can also be employed without modification.

To prepare the conductive thermoplastic composite materials according to the invention, strands of electrically conductive fibers are arranged in parallel, spread out and impregnated with a molten thermoplastic elastomer by melt pultrusion. In this procedure, the strands are drawn through the elastomer melt and the fiber/melt ratio is adjusted such that 0.1 to 70% by volume, preferably 5 to 20% by volume, of electrically conductive fibers is incorporated. The impregnated strands are granulated and, if appropriate, mixed with thermoplastic elastomer granules and the fiber content is adjusted in this way.

Astonishingly, it has even been possible for a large number of electrically conductive fiber strands having individual filament diameters of 1 to 20 μm to be impregnated to a very good degree with a molten, thermoplastic elastomer in a melt pultrusion process after parallel arrangement and spreading of the strands.

It is advantageous that the process allows high impregnating rates of 3 to 40 m/min, but preferably 5 to 20 m/min.

The impregnated strip of threads can be wound up continuously on spools or cut with a cutting device (strand granulator). In contrast to conventional short fiber material (only fiber lengths of less than 0.5 mm can be impregnated), in which cut fibers are compounded into the melt, the fiber length in the material prepared according to the invention corresponds to the granule length and is greater than 0.5 mm, preferably between 3 and 20 mm, particularly preferably between 5 and 15 mm.

Granules having a fiber content of 0.1 to 70% by volume are preferably prepared. This concentrate is diluted to fiber contents of 0.1 to 30% by volume, preferably 0.1–15% by volume, for processing. The blend component can comprise the same material as the matrix polymer or another thermoplastic. If the blend component is, for example, polypropylene (PP), polyamide (PA), polybutylene terephthalate (PBT), acrylonitrile/butadiene/styrene polymer (ABS), polycarbonate (PC) or similar thermoplastics, the matrix of the concentrate thus additionally serves as an impact modifier. In addition, the blend component can be reinforced with short or long fibers, which means that the rigidity and strength are increased. A blend component reinforced with long fibers can be a pultrusion product. The blend component furthermore can also be non-elastomeric thermoplastic granules. Astonishingly, the conductivity is increased by the addition of a blend component which is reinforced with non-conductive fibers or other non-conductive fillers.

The semi-finished products produced can then be processed to functional components by conventional processing technologies, such as injection molding, plastification/compression molding, blow molding, extrusion and the like.

It is known that non-elastomeric thermoplastics become electrically conductive by incorporation of small amounts of conductive fibers. However, it was unexpected that the fibers would also be distributed homogeneously in an elastomer during processing to functional components and would form a conductivity network.

Shaped articles which were produced from the composite materials according to the invention retained their high conductivity after solidification with mechanical deformation. The reason for this is perhaps that on the one hand the steel fibers are ductile and can thus be included in the deformation, and on the other hand the embedding in the matrix is so firm that no fiber pull-out takes place. In addition, the network formed by the long fibers is considerably less sensitive since fewer fiber ends which can be separated are present.

The shaped articles can with particular advantage be employed where systems filled with carbon black cannot be employed because of their poor mechanical and electrical properties or the intrinsic color (for example streaks from chair casters on a light-colored floor covering). These include applications in the ESD and EMI sector, such as conductive footmats, casters, in particular chair casters, shoe soles, conductive seals and sealing lips. In addition, flexible resistance heating elements can be produced.

The invention is explained in more detail with the following embodiment examples.

EXAMPLES

Example 1

A steel fiber strand of 9,000 tex having about 10,000 individual filaments and an individual filament diameter of about 10 μm was impregnated with a melt of a thermoplastic elastomer based on a polyurethane (TPU, MFI 21 kg, 190° C.=10–30 g/m) in a melt pultrusion process. Before entry into the die, the fiber strand was spread by a fiber pretension of about 100 N and by passing over heated tensioning bars. The fiber was passed through the impregnating die at a take-off speed of 5 m/min and the cooled fiber strand was cut to a fiber length of 10 mm using a strand granulator. The content of steel fibers was adjusted to 50% by weight (=10% by volume). The concentrate was diluted to a steel fiber content of 10% by weight with a polyurethane of the same viscosity as the matrix polymer of the concentrate (1 part of concentrate was mixed with 4 parts of TPU). The blend was processed on an injection molding machine to give test sheets of dimensions 80×80×2mm. The specific surface and volume conductivity was measured on the test sheets in accordance with DIN/VDE 0303 Part 30 (Table 1).

TABLE 1

| Resistance measurements in accordance with DIN/VDE 0303 Part 30 | | |
|---|---|---|
| Thermoplastic | Steel fiber/% by weight | |
| TPU-SF 10 | 10 | specific volume resistance kohm cm 1900 specific surface resistance kohm cm |
| TPU-SF 10 | 10 | 38 |

The core of the test sheets has a specific resistance in the injection direction (longitudinal orientation of the fibers during injection molding) of about 0.5 ohm cm (contacting via self-tapping screws).

Example 2

Strips 1 cm wide and 8 cm long were cut out of the test sheets according to Example 1 and heated to above 65° C. with a voltage source (contacting via self-tapping screws screwed into the strips):

| | |
|---|---|
| Distance between the contacts: | 7 cm |
| Voltage: | 8–12 V |
| Current (kept constant): | 0.4 A |
| Temperature achieved: | 65–100° C. |

The heating element was operated for more than 10 hours.

We claim:

1. An electrically conductive thermoplastic composite material having a specific volume resistance of less than $10^9$ ohm cm comprising 0.1 to 70% by volume of electrically conductive fibers having a fiber diameter and a fiber length, wherein said fibers are impregnated with a thermoplastic elastomer wherein the electrically conductive fibers are selected from the group consisting of metal fibers, metallized glass fibers and carbon fibers.

2. A composite material as claimed in claim 1, which consists of electrically conductive fibers and a thermoplastic elastomer.

3. A composite material as claimed in claim 1, wherein 5 to 95% by volume of the thermoplastic elastomer is replaced with a non-elastomeric thermoplastic.

4. A composite material as claimed in claim 1, wherein the fiber diameter of said electrically conductive fibers is from 1 to 100 μm and said electrically conductive fibers have a ratio of said fiber length to said fiber diameter of more than 500.

5. A composite material as claimed in claim 1, wherein said composite is free of conductive carbon black.

6. A process for the preparation of an electrically conductive thermoplastic composite material as claimed in claim 1, which comprises arranging strands of electrically conductive fibers in parallel, spreading them out and impregnating them with a molten thermoplastic elastomer by melt pultrusion, the strands being drawn through the elastomer melt and the fiber/melt ratio being adjusted such that 0.1 to 70% by volume, preferably 5 to 20% by volume, of electrically conductive fibers is incorporated, granulating the impregnated strands and, if appropriate, mixing the granules with thermoplastic elastomer granules and adjusting the fiber content in this way.

7. A process for the preparation of an electrically conductive thermoplastic composite material as claimed in claim 3, which comprises arranging strands of electrically conductive fibers in parallel, spreading them out and impregnating them with a molten thermoplastic elastomer by melt pultrusion, the strands being drawn through the elastomer melt and the fiber/melt ratio being adjusted such that 0.1 to 70% by volume, preferably 5 to 20% by volume, of electrically conductive fibers is incorporated, granulating the impregnated strands and, if appropriate, mixing the granules with non-elastomeric thermoplastic granules and adjusting the fiber content in this way.

8. The process as claimed in claim 6, wherein a content of electrically conductive fibers of 0.1 to 15% by volume is established in the mixture.

9. The process as claimed in claim 6, wherein the strands are drawn through the elastomer melt at a rate of 3 to 40 m/min during the melt pultrusion.

10. The process as claimed in claim 6, wherein the same thermoplastic elastomer is used to adjust the fiber content and during the melt pultrusion.

11. The process as claimed in claim 6, wherein a thermoplastic reinforced with short glass fibers is used to adjust the fiber content.

12. The process as claimed in claim 6, wherein a thermoplastic reinforced with long glass fibers is used to adjust the fiber content.

13. The process as claimed in claim 6, wherein the impregnated fiber strands are granulated to a length of 3 to 20 mm, in particular 5 to 15 mm.

14. A process for the preparation of an electrically conductive thermoplastic composite material as claimed in claim 2, which comprises arranging strands of electrically conductive fibers in parallel, spreading them out and impregnating them with a molten thermoplastic elastomer by melt pultrusion, the strands being drawn through the elastomer melt and the fiber/melt ratio being adjusted such that 0.1 to 70% by volume, preferably 5 to 20% by volume, of electrically conductive fibers is incorporated, and winding the impregnated strands onto spools.

15. A composite material as claimed in claim 1 for the production of casters.

16. A composite material as claimed in claim 1 for the production of sealing lips.

17. An electrically conductive thermoplastic composite material prepared by a process comprising the steps of:

(a) arranging strands of electrically conductive fibers in parallel, (b) spreading said strands apart, (c) impregnating said strands with a molten first thermoplastic elastomer by melt pultrusion to form impregnated strands, said strands being drawn through a melt of said first thermoplastic elastomer and the fiber/melt ratio being adjusted such that the content of said electrically conductive fibers in said impregnated strands is from 0.1 to 70% by volume, and (d) cutting said impregnated strands into electrically conductive thermoplastic composite granules wherein the electrically conductive fibers are selected from the group consisting of metal fibers, metallized glass fibers and carbon fibers.

18. The composite material of claim 17, further comprising the step of mixing said electrically conductive thermoplastic composite granules with additional granules comprising a non-elastomeric thermoplastic material, a second thermoplastic elastomeric material or mixtures thereof.

19. The composite material as claimed in claim 17, wherein said content of said electrically conductive fibers in said electrically conductive thermoplastic composite granules is from 0.1 to 15% by volume.

20. The composite material as claimed in claim 17, wherein said strands are drawn through said melt of said first thermoplastic elastomer at a rate of 3 to 40 m/min during said melt pultrusion.

21. The composite material as claimed in claim 18, wherein said second thermoplastic elastomer is the same as said first thermoplastic elastomer.

22. The composite material as claimed in claim 18, wherein said additional granules are reinforced with short glass fibers.

23. A composite material as claimed in claim 17, wherein said additional granules are reinforced with long glass fibers.

24. An electrically conductive thermoplastic composite material as claimed in claim 2, made by a process comprising the steps of:

(a) arranging strands of electrically conductive fibers in parallel, (b) spreading said strands out, (c) impregnating said strands with a molten thermoplastic elastomer by melt pultrusion to form impregnated strands, said strands being drawn through a melt of said thermoplastic elastomer and the fiber/melt ratio being adjusted such that the content of said electrically conductive fibers in said impregnated strands is from 0.1 to 70% by volume, and (d) winding said impregnated strands onto spools.

25. The composite of claim 1, wherein said metal fibers comprise steel fibers.

26. The composite of claim 17, wherein said content of said electrically conductive fibers in said impregnated strands is from 5 to 70% by volume.

* * * * *